United States Patent
Conklin

(10) Patent No.: US 9,906,833 B2
(45) Date of Patent: *Feb. 27, 2018

(54) METHODS AND SYSTEMS TO MONITOR A MEDIA DEVICE USING A DIGITAL AUDIO SIGNAL

(71) Applicant: The Nielsen Company (US), LLC, New York, NY (US)

(72) Inventor: Chuck Conklin, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,839

(22) Filed: Oct. 30, 2015

(65) Prior Publication Data

US 2016/0050452 A1   Feb. 18, 2016

Related U.S. Application Data

(63) Continuation of application No. 13/340,167, filed on Dec. 29, 2011, now Pat. No. 9,219,968.

(51) Int. Cl.
| | | |
|---|---|---|
| *G06F 17/00* | (2006.01) | |
| *H04H 60/33* | (2008.01) | |
| *H04H 60/32* | (2008.01) | |
| *H04N 21/439* | (2011.01) | |
| *H04R 29/00* | (2006.01) | |
| *H04N 21/442* | (2011.01) | |

(52) U.S. Cl.
CPC ... *H04N 21/4394* (2013.01); *H04N 21/44213* (2013.01); *H04R 29/00* (2013.01); *H04H 60/32* (2013.01); *H04H 60/33* (2013.01)

(58) Field of Classification Search
CPC ..... H04H 60/32; H04L 41/0809; H04N 17/00
See application file for complete search history.

(56) References Cited

U.S. PATENT DOCUMENTS

| | | |
|---|---|---|
| 3,130,265 A | 4/1964 | Leonard |
| 3,514,530 A | 5/1970 | Simons |

(Continued)

FOREIGN PATENT DOCUMENTS

WO   2011080707   7/2011

OTHER PUBLICATIONS

Patent Cooperation Treaty, "International Search Report and Written Opinion," issued in connection with Application No. PCT/US12/70163, Feb. 25, 2013, 8 pages.

United States Patent and Trademark Office, "Non-Final Office Action," issued in connection with U.S. Appl. No. 13/340,167, dated Apr. 2, 2015, 30 pages.

(Continued)

*Primary Examiner* — Thomas Maung
(74) *Attorney, Agent, or Firm* — Hanley, Flight & Zimmerman, LLC

(57) ABSTRACT

Methods and systems are disclosed to monitor a media device. An example method includes attempting to detect a logical transition between two sequential bits in a sequence of bits of a digital audio signal output by a port of the media device, the digital audio signal being encoded via differential encoding; and when the logical transition is detected, generating operating state data including a first time and indicating that the media device was in an on state at the first time; or when the logical transition is not detected, generating the operating state data including the first time and indicating that the media device was in an off state at the first time.

15 Claims, 10 Drawing Sheets

(56) References Cited

U.S. PATENT DOCUMENTS

| | | |
|---|---|---|
| 4,450,431 A | 5/1984 | Hochstein |
| 4,600,829 A | 7/1986 | Walton |
| 4,688,232 A * | 8/1987 | Fox .................. H03M 5/12 |
| | | 360/44 |
| 5,481,294 A | 1/1996 | Thomas et al. |
| 5,493,650 A | 2/1996 | Reinke et al. |
| 6,130,703 A | 10/2000 | Spriester et al. |
| 6,184,918 B1 | 2/2001 | Goldschmidt Iki et al. |
| 7,695,777 B2 | 4/2010 | Sato et al. |
| 8,225,342 B2 | 7/2012 | Mears et al. |
| 2004/0210922 A1 * | 10/2004 | Peiffer ................ H04H 60/37 |
| | | 725/9 |
| 2005/0099999 A1 | 5/2005 | Phillips et al. |
| 2006/0171474 A1 | 8/2006 | Ramaswamy et al. |
| 2006/0232575 A1 | 10/2006 | Nielsen |
| 2007/0051228 A1 | 3/2007 | Weir et al. |
| 2007/0232232 A1 | 10/2007 | Matsuo et al. |
| 2008/0148307 A1 * | 6/2008 | Nielsen ................ H04H 60/32 |
| | | 725/9 |
| 2010/0083299 A1 | 4/2010 | Nelson et al. |
| 2010/0161506 A1 | 6/2010 | Bosenick et al. |
| 2011/0013905 A1 | 1/2011 | Wang et al. |
| 2011/0295926 A1 | 12/2011 | Battiston et al. |
| 2013/0170657 A1 | 7/2013 | Conklin |

OTHER PUBLICATIONS

United States Patent and Trademark Office, "Notice of Allowance," issued in connection with U.S. Appl. No. 13/340,167, dated Sep. 3, 2015, 12 pages.

* cited by examiner

METHODS AND SYSTEMS TO MONITOR A MEDIA DEVICE USING A DIGITAL AUDIO SIGNAL

RELATED APPLICATIONS

This patent arises from a continuation of U.S. patent application Ser. No. 13/340,167, filed Dec. 29, 2011, entitled "Methods and Systems to Monitor a Media Device Using a Digital Audio Signal." The entirety of U.S. patent application Ser. No. 13/340,167 is incorporated herein by reference.

FIELD OF THE DISCLOSURE

This patent relates generally to home audience measurement, and, more particularly, to methods and systems to monitor a media device using a digital audio signal.

BACKGROUND

Audience measurement of media, such as television and/or radio programs, is typically carried out by monitoring media exposure of panelists that are statistically selected to represent particular demographic groups. Using various statistical methods, the collected media exposure data is processed to determine the size and demographic composition of the audience(s) for media programs of interest. The audience size and demographic information is valuable to advertisers, broadcasters and/or other entities. For example, audience size and demographic information is a factor in the placement of advertisements, as well as a factor in valuing commercial time slots during particular programs.

DETAILED DESCRIPTION

Figure 1:
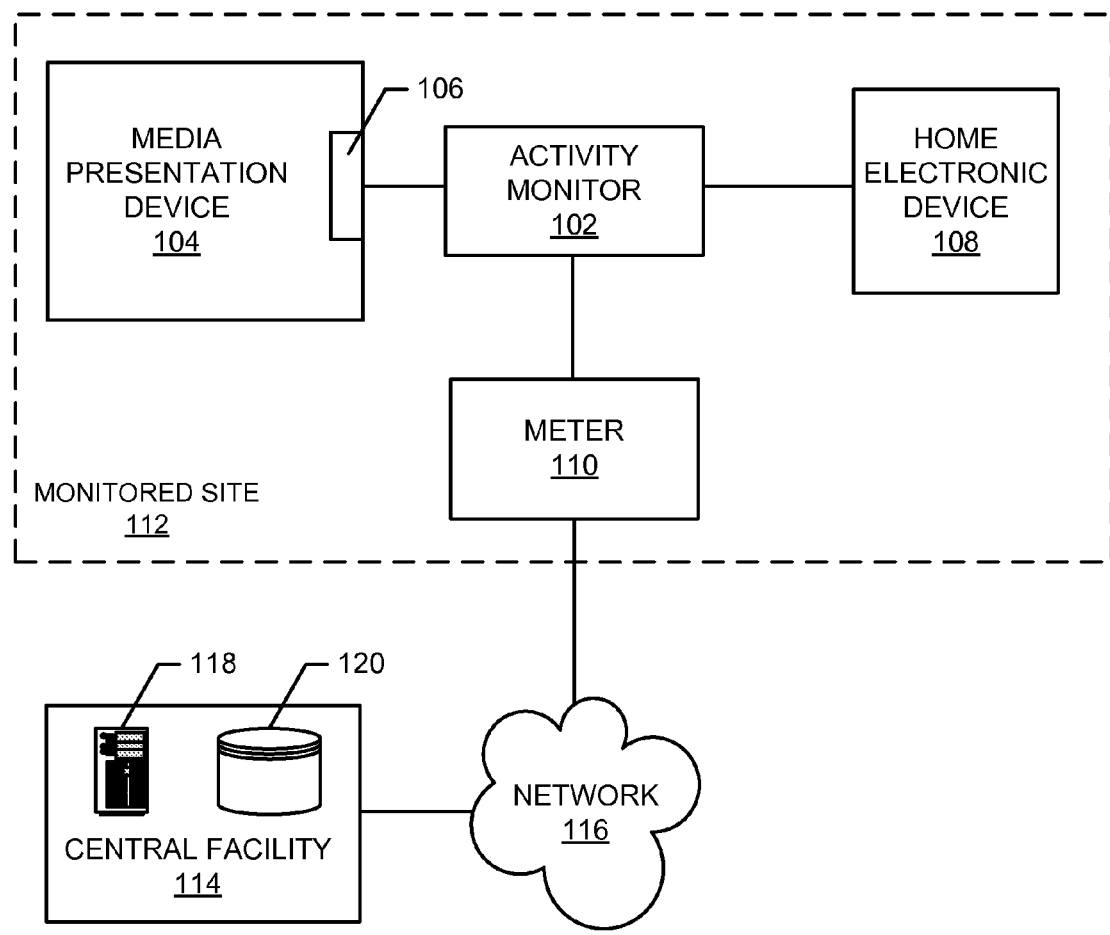
FIG. 1 illustrates an example activity monitor implemented in accordance with the teachings of this disclosure to monitor a media presentation device.

Audience measurement companies enlist persons to participate in measurement panels. Such persons agree to allow the audience measurement company to measure their exposure to media (e.g., television, radio, Internet, advertising, signage, outdoor advertising, etc.). In order to credit audience measurement data with actual panelist exposure, the audience measurement company may wish to monitor an operating state of a media device (e.g., the company may wish to verify that a television is on before crediting viewing of a program on the television).

Some prior techniques used to monitor operating states of media devices monitor current flows to the media devices. In such techniques, a current to a media device is measured when the media device is known to be in an on or off state and these measurements are used to determine threshold values for each state. Current levels are then compared to these threshold values to determine the operating state of the media device. However, some media devices are being designed in ways that make the implementation of such techniques more difficult. For example, some media devices are designed with a current limiting soft start where the media device may be in an on state but it may take additional time for the current at the media device to reach the threshold value. In some examples, media devices are designed with cooling systems to operate when the media devices are powered off. In such examples, the current level when the media device is powered off may be greater than the current level when the media device was powered on. These media device designs may lead to inaccurate determinations of operating states of the media devices.

Example methods, apparatus, and/or computer readable storage media disclosed herein monitor an operating state of a media device using a digital audio signal and/or collect audio data exchanged at the media device. For instance, some disclosed example methods, apparatus, and/or articles of manufacture attempt to detect a transition in a digital audio signal output by a port of a media device. If the transition is detected, some such disclosed example methods determine the media device is in an on state. If the transition is not detected, some such disclosed example methods determine the media device is in an off state.

Some disclosed example methods, apparatus, and/or articles of manufacture attempt to collect audio from a digital signal output by a port of the media device. If the audio is collected, some such disclosed example methods, apparatus, and/or articles of manufacture determine the media device is in an on state. If the audio is not collected, some such disclosed example methods determine the media device is in an off state.

Some disclosed example systems include a transition detector to attempt to detect a transition in a digital audio signal output by a port of the media device. If the transition is detected, the transition detector of some such disclosed example systems determines the media device is in an on state. If the transition is not detected, the transition detector of some such disclosed example systems determines the media device is in an off state.

Some disclosed example systems include an audio determiner to attempt to collect audio from a digital signal output by a port of the media device. If the audio is collected, the audio determiner of some such disclosed example systems determines the media device is in an on state. If the audio is not collected, the audio determiner of some such disclosed example systems determines the media device is in an off state.

Some disclosed example tangible computer-readable storage media include instructions that, when executed, cause a computing device to at least attempt to detect a transition in a digital audio signal output by a port of a media device. The instructions of some such examples cause the computing device to determine the media device is in an on state if the transition is detected. The instructions of some such examples cause the computing device to determine the media device is in an off state if the transition is not detected.

Some disclosed example tangible computer-readable storage media include instructions that, when executed, cause a computing device to at least attempt to collect audio from a digital signal output by a port of the media device. The instructions of some such examples cause the computing device to determine the media device is in an on state if the audio is collected. The instructions of some such examples cause the computing device to determine the media device is in an off state if the audio is not collected.

Digital signals (e.g., digital audio signals) are often communicated between media devices (e.g., televisions, digital versatile disk ("DVD") players, computers, stereo systems, and/or game consoles). Media devices are equipped with a variety of interfaces to communicate digital signals between media devices (e.g., Audio Engineering Society 3 ("AES3") and Sony/Philips Digital Interconnect Format ("S/PDIF")). In many media devices, a digital signal is present (e.g., communicated) when the media device is operating (e.g., in an on state) and is not present when the media device is not operating (e.g., in an off state).

Often times, digital signals are sent using biphase mark code ("BMC"), a form of modulation. BMC, also called Differential Manchester encoding, is a differential encoding technique in which the presence or absence of transitions in a data stream indicates logical value. In the BMC technique, a bit is represented by a transition from one voltage amplitude to another of the same value, but opposite in polarity. Thus, a receiver looks for transitions and where the transitions occur to extract bit values.

When data is communicated at a media device using BMC, there will be digital pulses (e.g., logical transitions) in the signal. Thus, digital pulses are present in the signal when the media device is in an on state. Alternatively, digital pulses are not present in the signal when the media device is in an off state.

Example activity monitors disclosed herein monitor activities of a media device using a digital audio signal. In some disclosed examples, an activity monitor connects to a port (e.g., an S/PDIF port) of a media presentation device, such as a television, to receive a digital audio signal. The activity monitor of some examples monitors digital pulses on the line to determine an operating state of the media presentation device. Based on transitions in logical values on the line, the activity monitor determines, stores, and/or reports an on or off state of the media presentation device.

In some examples, an activity monitor obtains a signal from a port (e.g., an S/PDIF port) on a media presentation device and decodes the signal to determine if the media presentation device is in an on or off state. In some disclosed examples, the activity monitor collects data from the signal and stores and/or transfers the collected data to a meter and/or a central monitoring site. In some examples, the activity monitor collects the signal itself and transfers the signal to a meter and/or a central monitoring site. The example activity monitor transfers operating state data, data collected from a signal, and/or the signal itself to a central data facility and/or a metering device either wirelessly or via a wired connection for further audience measurement processing.

Example activity monitors disclosed herein are implemented in the context of panelist audience measurement which may occur, for instance, in the home of the panelist. In some examples, the activity monitor enables a determination of an operating state of a media presentation device and/or collection of data being transferred and/or received by the media presentation device. This information is a factor in determining when and/or whether to monitor (e.g., collect and/or store) audience measurement data and/or whether to credit collected data as actual exposure to media.

FIG. 1 illustrates an example activity monitor 102 implemented in accordance with the teachings of this disclosure to monitor a media presentation device 104 using a digital audio signal obtained from a port 106. The port 106 of the illustrated example forms part of (e.g., is integrated with) the example media presentation device 104. The port 106 may be, for example, an S/PIDF port. In the illustrated example, the activity monitor 102, the media presentation device 104, a home electronic device 108, and a meter 110 are located in a home monitoring site 112. The home monitoring site 112 of the illustrated example is a household that has volunteered, has been selected and/or has agreed to participate in a home audience measurement system (e.g., residents of the household have agreed to monitoring of their media exposure activity).

The activity monitor 102 of the illustrated example is used to monitor the media presentation device 104 to aid in the processing of audience measurement data obtained at the monitored site 112. In the illustrated example, the activity monitor 102 connects to the port 106 of the media presentation device 104. The activity monitor 102 and the port 106 may be connected using, for example, coaxial cables (e.g., with Radio corporation of America ("RCA") connectors) or optical fiber connections (e.g., with Toshiba Link ("TOSLINK") connectors). Many devices, such as the media presentation device 104, are equipped with ports to enable communication with external devices, such as the home electronic device 108. The media presentation device 104 may be, for example, a television, a radio, a computer, a stereo system, a DVD player, a game console, etc. The home electronic device 108 may be, for example, a DVD player, a digital camera, a game console, a speaker, etc.

The activity monitor 102 of the illustrated example operates as a pass-through device so that communication between the media presentation device 104 and the home electronic device 108 is not disturbed (e.g., the media presentation device 104 and/or the home electronic device 108 can be used as normal while the activity monitor 102 is connected). The activity monitor 102 of the illustrated example does not interfere with operation of the media presentation device 104. The activity monitor 102 and the home electronic device 108 may be connected using, for example, coaxial cables or optical fiber connections.

To aid in processing audience measurement data obtained at the monitored site 112, the activity monitor 102 of the illustrated example monitors signals being output at the port 106 of the media presentation device 104. In the illustrated example, the activity monitor 102 determines an operating state of the media presentation device 104 (e.g., whether the media presentation device 104 is in an on or off state) by monitoring logical transitions in the signal being output at the port 106. As described above, if a transition is detected in the signal at the port 106, the example media presentation device 104 is determined to be powered on. If a transition it not detected in the signal, the example media presentation device 104 is determined to be powered off. While the design of the activity monitor 102 of the illustrated example allows the media presentation device 104 to communicate with the home electronic device 108, the activity monitor 102 may additionally or alternatively determine an operating state of the media presentation device 104 when an external device (e.g., the home electronic device 108) is not connected.

To detect a transition in the signal at the media presentation device 104, the activity monitor 102 of the illustrated example obtains the signal output by the port 106 of the media presentation device. The activity monitor 102 of the illustrated example compares a first state of the signal (e.g., a high or low state) at the port 106 to a second state of the signal (e.g., a high or low state). If the first and second states are different (e.g., the first state is high and the second state is low), the activity monitor 102 of the illustrated example determines a transition in the signal has occurred and, thus, that the media presentation device 104 is in an on state. If the first and second states are the same (e.g., both the first and second states are low), the activity monitor 102 of the illustrated example determines that no transition has occurred in the signal and, thus, that the media presentation device 104 is in an off state. The first and second states may be, for example, sequential bits and/or, for example, some period of time may pass between first and second bits to be compared.

In some examples, the activity monitor 102 attempts to collect audio data from the signal at the port 106. In such examples, the collection of audio data is used by the activity monitor 102 to determine the operating state of the media presentation device 104. If the signal at the port 106 contains audio data, the media presentation device 104 is operating (e.g., is in an on state). If the signal at the port 106 does not contain audio data, the media presentation device 104 is not operating (e.g., is in an off state). To determine the operating state of the media presentation device 104, the activity monitor 102 decodes the signal obtained at the port 106 and determines if audio data is present. If audio data is present, the activity monitor 102 determines that the media presentation device 104 is in an on state. If audio data is not present, the activity monitor 102 determines that the media presentation device 104 is in an off state.

The operating state of the media presentation device 104 is important in the context of home audience measurement to determine whether to credit collected audience measurement data as data actually presented to an audience. For example, it is possible for a media device, such as a set top box, integrated receiver decoder, cable converter, etc., to output media signals that are not actually presented to an audience because the corresponding information presenting device (e.g., a television) is turned off. Detecting if the information presenting device is on or off is, thus, an important clue in determining whether to credit an audience with exposure to media (e.g., media content or an advertisement), especially in instances where the source device (e.g., the set top box) is monitored to identify content or tuning information and the source device may be left on when the information presenting device is off.

In examples where the activity monitor 102 determines an operating state of the media presentation device 104 by decoding a signal obtained at the port 106, the activity monitor 102 may also collect data from the signal to be used in further processing and/or analysis of audience measurement data. Collected data may include, for example, a type of data transfer occurring, source information, a payload, a media or station identifier code extracted from the audio, metadata, a signature (e.g., an inherent characteristic of the signal that may be used as a fingerprint to identify the signal and/or the media it carries), etc. The activity monitor 102 may also collect the signal itself.

Consumers often utilize external media devices (e.g., DVD players, set top boxes, etc.) to view content on media presentation devices, such as the media presentation device 104. Use of the activity monitor 102 to collect data from signals at the media presentation device 104 is useful in the context of home audience measurement to further analyze collected audience measurement data.

Once the activity monitor 102 has determined an operating state of the media presentation device 104 and/or has collected data from the signal at the media presentation device 104, the activity monitor 102 of the illustrated example stores and timestamps the determined information and/or collected data. For example, the activity monitor 102 stores and timestamps operating state data representative of whether the media presentation device 104 is in an on state or an off state. Operating state data may be, for example, a bit set high to indicate the media presentation device 104 is powered on and/or a bit set low to indicate the media presentation device 104 is powered off. In some examples, the activity monitor 102 additionally or alternatively stores and timestamps data collected from the signal obtained at the port 106 of the media presentation device 104.

In the illustrated example, the activity monitor 102 transmits operating state data, collected data, and/or the signal itself to the meter 110. The meter 110 of the illustrated example is located at the monitored site 112 to perform local processing of information collected by the example activity monitor 102 and/or any other device used to collect audience measurement data, such as, for example, a people meter which collects information to identify persons in the audience. For example, if the activity monitor 102 provides the meter 110 with a media signal (e.g., an audio portion of a media signal), the meter 110 may process the media signal (or a portion thereof) to extract codes and/or metadata, and/or to generate signatures for use in identifying the media and/or a station transmitting the media. In some examples, the meter 110 may perform the timestamping discussed above. In the illustrated example, the activity monitor 102 and the meter 110 are connected using wired connections. In some examples, the activity monitor 102 transfers information and/or data to the meter 110 wirelessly.

The meter 110 of the illustrated example collects and/or processes the home audience measurement data locally and/or transfers the processed data to the remotely located central data facility 114 via the network 116 for further processing. The central facility 114 of the illustrated example collects and/or stores, for example, media exposure data, media monitoring data, and/or demographic information that is collected by multiple media monitoring devices such as, for example, the activity monitor 102 associated with different monitored sites. The central facility 114 may be, for example, a facility associated with The Nielsen Company (US), LLC or any affiliate of The Nielsen Company (US), LLC. The central facility 114 of the illustrated example includes a server 116 and a database 118 that may be implemented using any suitable processor, memory and/or data storage apparatus such as that shown in FIG. 10.

The network 116 of the illustrated example is used to communicate information and/or data between the example meter 110 and the central facility 114. The network 116 may be implemented using any type of public and/or private network such as, but not limited to, the Internet, a telephone network, a local area network ("LAN"), a cable network, and/or a wireless network. To enable communication via the network 116, the meter 110 of the illustrated example includes a communication interface that enables connection to an Ethernet, a digital subscriber line ("DSL"), a telephone line, a coaxial cable, and/or any wireless connection, etc.

Figure 2:
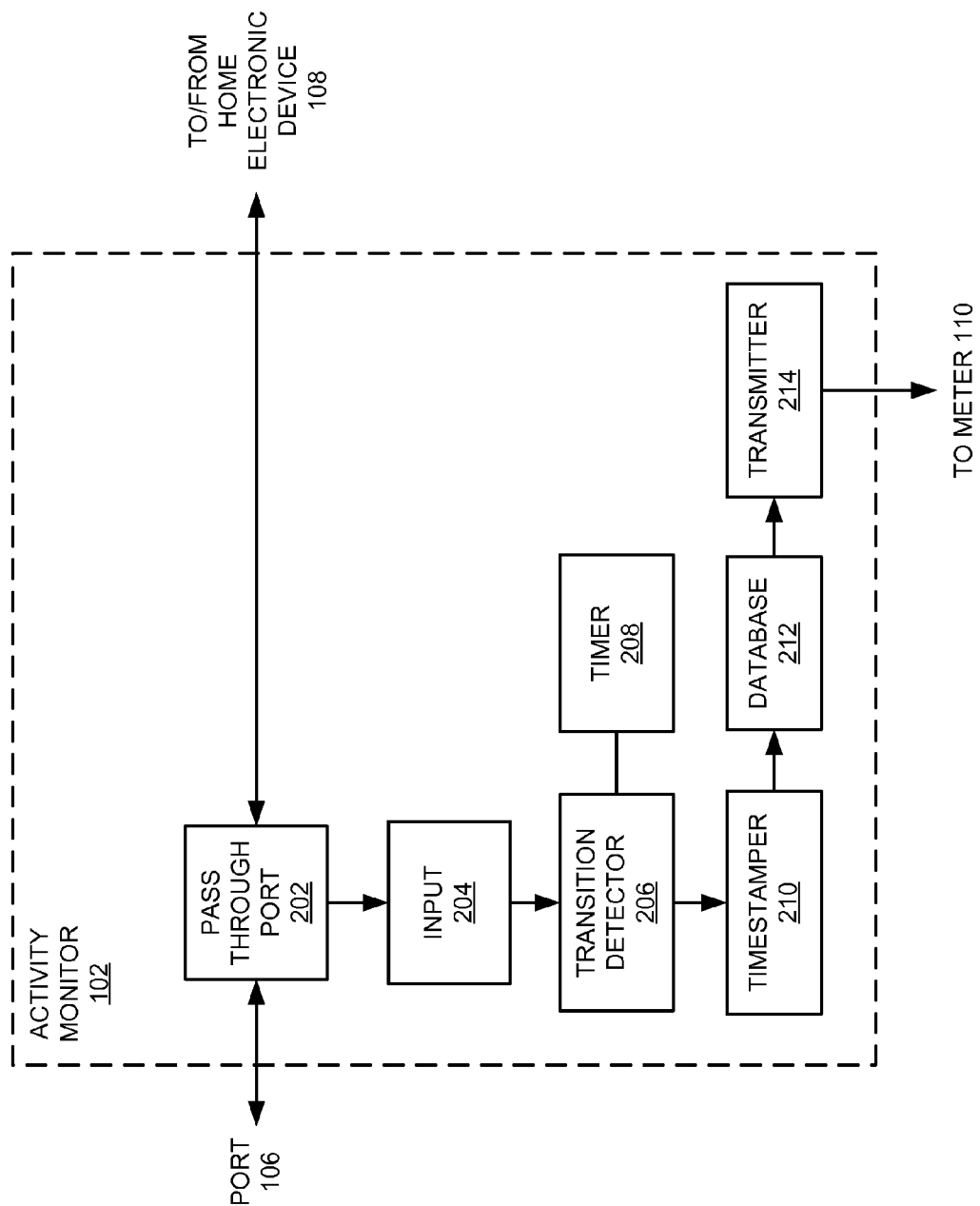
FIG. 2 illustrates an example implementation of the activity monitor of FIG. 1.

FIG. 2 is a block diagram of an example implementation of the activity monitor 102 of FIG. 1. In the illustrated example, the activity monitor 102 is used to determine an operating state of a media presentation device, for example, the media presentation device 104 of FIG. 1. The activity monitor 102 of the illustrated example monitors a signal obtained at the port 106 to determine the operating state of the media presentation device 104. In the illustrated example, the activity monitor 102 includes a pass through port 202, an input 204, a transition detector 206, a timer 208, a timestamper 210, a database 212, and a transmitter 214.

The pass through port 202 of the illustrated example allows communication between the media presentation device 104 and an external device (e.g., the home electronic device 108) to occur undisturbed. The signal obtained at the port 106 is passed to the home electronic device 108 by the pass through port 202 of the illustrated example so that the home electronic device 108 can be used as normal while the activity monitor 102 is connected. The pass through port 202 may contain an input (e.g., a receiver) and an output (e.g., a transmitter) to pass the signal from the port 106 to the home electronic device 108. If, for example, fiber optic cables (e.g., TOSLINK connectors) are used to connect the media presentation device 104 to the activity monitor 102, the input within the activity monitor 102 may convert the optical signal to an electrical signal. If, for example, fiber optic cables are used to connect the activity monitor 102 to the home electronic device 108, the output within the activity monitor 102 may convert the electrical signal to an optical signal. Although the pass through port 202 of the illustrated example allows the activity monitor 102 to monitor the media presentation device 104 while the home electronic device 108 is connected, the activity monitor 102 may monitor the media presentation device 104 when the home electronic device 108 is not connected.

The input 204 of the illustrated example is used as a tap to collect the signal from the pass through port 202. The input 204 of the illustrated example passes the tapped signal to the transition detector 206. The transition detector 206 of the illustrated example detects a transition in the tapped signal using the timer 208. If there is a transition in the signal, the transition detector 206 of the illustrated example determines that the media presentation device 104 is in an on state. If no transition is detected in the signal, the transition detector 206 of the illustrated example determines that the media presentation device 104 is in an off state. An example manner of implementing the transition detector 206 is described below in connection with FIG. 3.

The transition detector 206 of the illustrated example transfers operating state data to the timestamper 210. The operating state data is indicative of whether the media presentation device 104 is in an on or an off state. Operating state data may be, for example, a bit set high to indicate the media presentation device 104 is in an on state and/or a bit set low to indicate the media presentation device 104 is in an off state. In some examples, the operating state data may be messages indicating if the media presentation device 104 is in an on or an off state. The timestamper 210 of the illustrated example timestamps the operating state data to record times and/or dates at which the media presentation device 104 is in the corresponding operating state. The timestamper 210 passes the timestamped operating state data to the database 212 where the timestamped operating state data is stored. The timestamped operating state data is passed to the transmitter 214 of the illustrated example to be transmitted from the activity monitor 102 to a meter, for example, the meter 110 of FIG. 1.

In some examples, the transmitter 214 passes operating state data to a central facility, such as the central facility 114 of FIG. 1, when no meter 110 is present. In some examples, the operating state data is passed directly from the transition detector 206 to the transmitter 214 to be transmitted to the meter 110 and the meter 110 performs the timestamping (e.g., the timestamper 210 is omitted from the activity monitor 102). In the illustrated example, the activity monitor 102 transfers the operating state data to the meter 110 using a wired connection. In other examples, the activity monitor 102 transfers the operating state data to the meter 110 wirelessly.

While the example activity monitor 102 has been illustrated in FIG. 2, one or more of the elements, processes and/or devices illustrated in FIG. 2 may be combined, divided, re-arranged, omitted, eliminated and/or implemented in any other way. Further, the pass through port 202, the input 204, the transition detector 206, the timer 208, the timestamper 210, the database 212, the transmitter 214, and/or, more generally, the example activity monitor 102 of FIG. 2 may be implemented by hardware, software, firmware and/or any combination of hardware, software and/or firmware. Thus, for example, any of the example pass through port 202, the input 204, the transition detector 206, the timer 208, the timestamper 210, the database 212, the transmitter 214, and/or, more generally, the example activity monitor 102 of FIG. 2 could be implemented by one or more circuit(s), programmable processor(s), application specific integrated circuit(s) ("ASIC(s)"), programmable logic device(s) ("PLD(s)") and/or field programmable logic device(s) ("FPLD(s)"), etc. When any of the apparatus or system claims of this patent are read to cover a purely software and/or firmware implementation, at least one of the example pass through port 202, the input 204, the transition detector 206, the timer 208, the timestamper 210, the database 212, and/or the transmitter 214 are hereby expressly defined to include a tangible computer readable medium such as a memory, DVD, compact disc ("CD"), etc. storing the software and/or firmware. Further still, the example activity monitor 102 of FIG. 2 may include one or more elements, processes and/or devices in addition to, or instead of, those illustrated in FIG. 2, and/or may include more than one of any or all of the illustrated elements, processes and devices.

Figure 3:
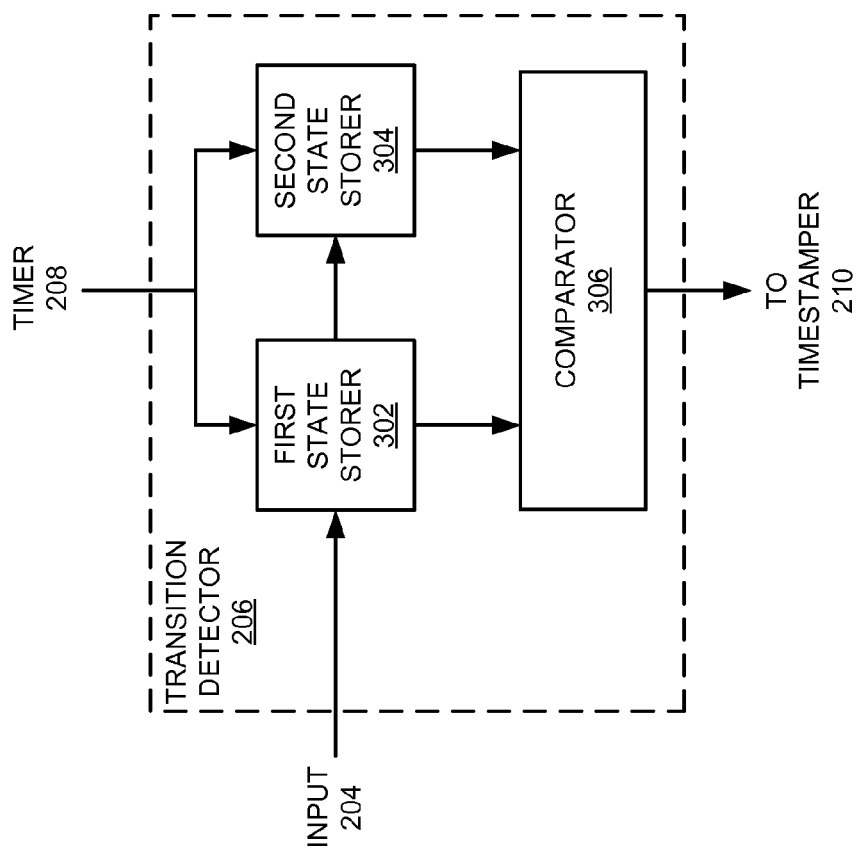
FIG. 3 illustrates an example implementation of the transition detector of FIG. 2.

FIG. 3 is a block diagram of an example implementation of the transition detector 206 of FIG. 2. In the illustrated example, the transition detector 206 is used to determine an operating state of the media presentation device 104 by detecting a transition in the signal obtained from the input 204 via the pass through port 202. In the illustrated example, the transition detector 206 includes a first state storer 302, a second state storer 304, and a comparator 306.

The first data storer 302 of the illustrated example receives the signal from the input 204 and stores a first state of the signal. The first state of the signal may be a high state or a low state (e.g., a bit set high or a bit set low). The first data storer 302 of the illustrated example uses a clock signal provided by the timer 208 to determine when to pass the signal to the second state storer 304. For example, the timer 208 may set a time interval that, once lapsed, indicates that the first state storer 302 is to pass the signal to the second state storer 304. Once the signal is passed from the first state storer 302 to the second state storer 304, the second state storer 304 of the illustrated example stores a second state of the signal. The second state of the signal may be a high state or a low state (e.g., a bit set high or a bit set low). The passing of the signal may be a continuous process such that, as the second state storer 304 is storing a second state of the signal, the first state storer 302 is storing a next first state of the signal. This process allows the transition detector 206 of the illustrated example to continuously compare states of the signal.

The first state storer 302 of the illustrated example passes the first state of the signal to the comparator 306. The second state storer 304 of the illustrated example passes the second state of the signal to the comparator 306. The comparator 306 of the illustrated example compares the first state and the second state to determine if there has been a transition in the signal. If the first state of the signal is equal (e.g., substantially the same as, within a degree of tolerance) to the second state of the signal (e.g., the first state is a bit set high and the second state is a bit set high), the comparator 306 of the illustrated example determines that there has been no transition in the signal and, thus, that the media presentation device 104 is in an off state. If the first state of the signal is different than the second state of the signal (e.g., the first state is a bit set high and the second state is a bit set low), the comparator 306 of the illustrated example determines that there has been a transition in the signal and, thus, that the media presentation device 104 is in an on state. Whether the signal starts in a high or low state is unimportant to the comparator 306 because the comparator 306 is concerned with transitions in the signal, not the values themselves, and transitions are present in the signal when the media presentation device 104 is in an on state. The comparator 306 of the illustrated example passes operating state data indicative of whether the media presentation device 104 is in an on or off state to the timestamper 210. Operating state data may be, for example, a bit set high to indicate the media presentation device 104 is in an on state and/or a bit set low to indicate the media presentation device 104 is in an off state. In some examples, the operating state data is a message indicating if the media presentation device 104 is in an on state or an off state.

While the example transition detector 206 has been illustrated in FIG. 3, one or more of the elements, processes and/or devices illustrated in FIG. 3 may be combined, divided, re-arranged, omitted, eliminated and/or implemented in any other way. Further, the first state storer 302, the second state storer 304, the comparator 306, and/or, more generally, the example transition detector 206 of FIG. 3 may be implemented by hardware, software, firmware and/or any combination of hardware, software and/or firmware. Thus, for example, any of the example first state storer 302, the second state storer 304, the comparator 306, and/or, more generally, the example transition detector 206 of FIG. 3 could be implemented by one or more circuit(s), programmable processor(s), ASIC(s), PLD(s) and/or FPLD(s), etc. When any of the apparatus or system claims of this patent are read to cover a purely software and/or firmware implementation, at least one of the example first state storer 302, the second state storer 304, and/or the comparator 306 are hereby expressly defined to include a tangible computer readable medium such as a memory, DVD, CD, Blu-ray, etc. storing the software and/or firmware. Further still, the example transition detector 206 of FIG. 3 may include one or more elements, processes and/or devices in addition to, or instead of, those illustrated in FIG. 3, and/or may include more than one of any or all of the illustrated elements, processes and devices.

Figure 4:
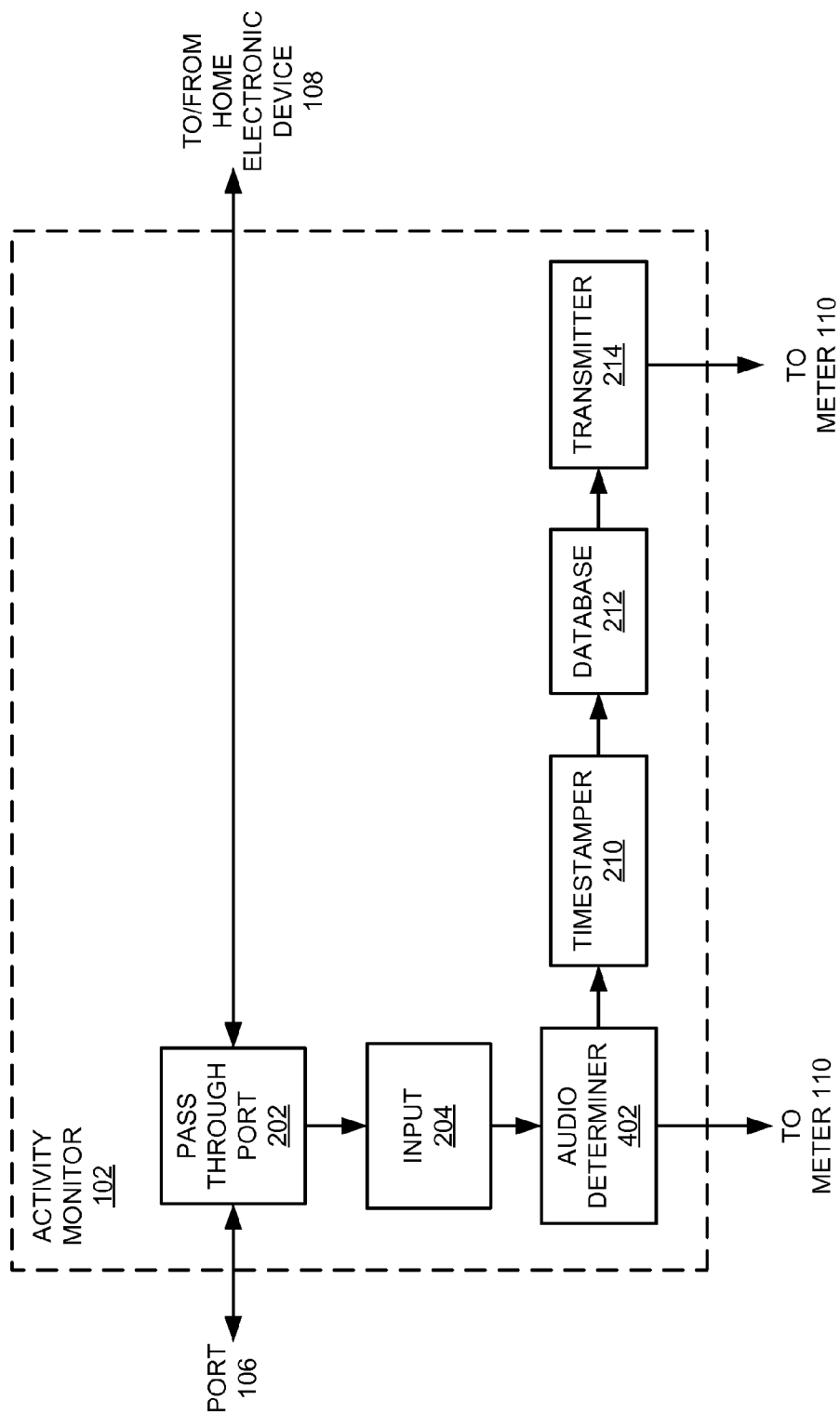
FIG. 4 illustrates another example implementation of the activity monitor of FIG. 1.

FIG. 4 is a block diagram of another example implementation of the activity monitor 102 of FIG. 1. In the illustrated example, the activity monitor 102 determines an operating state of the media presentation device 104 by decoding the signal obtained at the port 106. The activity monitor 102 of the illustrated example also collects data from the signal obtained at the port 106. In the illustrated example, the activity monitor 102 includes the pass through port 202, the input 204, an audio determiner 402, the timestamper 210, the database 212, and the transmitter 214. The pass through port 202, the input 204, the timestamper 210, the database 212, and the transmitter 214 are similar to their counterparts in the example of FIG. 2 and, thus, have been assigned the same reference numerals. Elements numbered with like reference numbers are substantially similar and/or identical and, thus, are not redescribed in detail here. Instead, the interested reader is referred to the above descriptions of the like numbered elements for a full and complete description of the same.

The audio determiner 402 of the illustrated example receives a signal obtained at the port 106 via the pass through port 202 and the input 204. The audio determiner 402 of the illustrated example decodes the signal to determine the operating state of the media presentation device 104 and to collect data for further audience measurement processing. The audio determiner 402 may decode the signal using any appropriate decoding method and/or technique. Once the signal has been decoded, the audio determiner 402 of the illustrated example determines if audio data is present. If audio data is present, the audio determiner 402 of the illustrated example determines that the media presentation device 104 is in an on state. If audio data is not present for more than a threshold period of time, the audio determiner 402 of the illustrated example determines that the media presentation device 402 is in an off state. The audio determiner 402 of the illustrated example passes operating state data indicative of whether the media presentation device 104 is in an on or off state to the timestamper 210. Operating state data may be, for example, a bit set high to indicate the media presentation device 104 is in an on state and/or a bit set low to indicate the media presentation device 104 is in an off state and/or a message to indicate an on or off state. The timestamper 210 timestamps the operating state data, the database 212 stores the operating state data, and the transmitter 214 transmits the operating state data to the meter 110.

The audio determiner 402 of the illustrated example also collects data from the signal obtained from the data input 402. Collected data may include, for example, a type of data transfer occurring, source information, a payload, a code, metadata, a signature and/or the audio signal itself. The audio determiner 402 of the illustrated example transfers the collected data to the timestamper 210 to be timestamped and stored in the database 212. The timestamped data is passed to the transmitter 214 of the illustrated example to be transmitted to the meter 110. In some examples, the audio determiner 402 transfers the signal itself and/or collected data to the meter 110. In some examples, the transmitter 214 transfers collected data and/or the audio signal to a central facility, for example, the central facility 114 of FIG. 1, when no meter 110 is present. In some examples, the audio determiner 402 transfers the data and/or the audio signal directly to the transmitter 214 to be transmitted to the meter 110 and the meter performs the timestamping (e.g., the timestamper 210 is omitted from the activity monitor 102). In the illustrated example, the activity monitor 102 transfers the collected data and/or the audio signal to the meter 110 using a wired connection. In some examples, the activity monitor 102 transfers the collected data and/or the audio signal to the meter 110 wirelessly.

While the example activity monitor 102 has been illustrated in FIG. 4, one or more of the elements, processes and/or devices illustrated in FIG. 4 may be combined, divided, re-arranged, omitted, eliminated and/or implemented in any other way. Further, the pass through port 202, the input 204, the timestamper 210, the database 212, the transmitter 214, the audio determiner 402, and/or, more generally, the example activity monitor 102 of FIG. 4 may be implemented by hardware, software, firmware and/or any combination of hardware, software and/or firmware. Thus, for example, any of the example pass through port 202, the input 204, the timestamper 210, the database 212, the transmitter 214, the audio determiner 402, and/or, more generally, the example activity monitor 102 of FIG. 4 could be implemented by one or more circuit(s), programmable processor(s), ASIC(s), PLD(s) and/or FPLD(s), etc. When any of the apparatus or system claims of this patent are read to cover a purely software and/or firmware implementation, at least one of the example pass through port 202, the input 204, the timestamper 210, the database 212, the transmitter 214, and/or the audio determiner 402 are hereby expressly defined to include a tangible computer readable medium such as a memory, DVD, CD, Blu-ray, etc. storing the software and/or firmware. Further still, the example activity monitor 102 of FIG. 4 may include one or more elements, processes and/or devices in addition to, or instead of, those illustrated in FIG. 4, and/or may include more than one of any or all of the illustrated elements, processes and devices.

Figure 5:
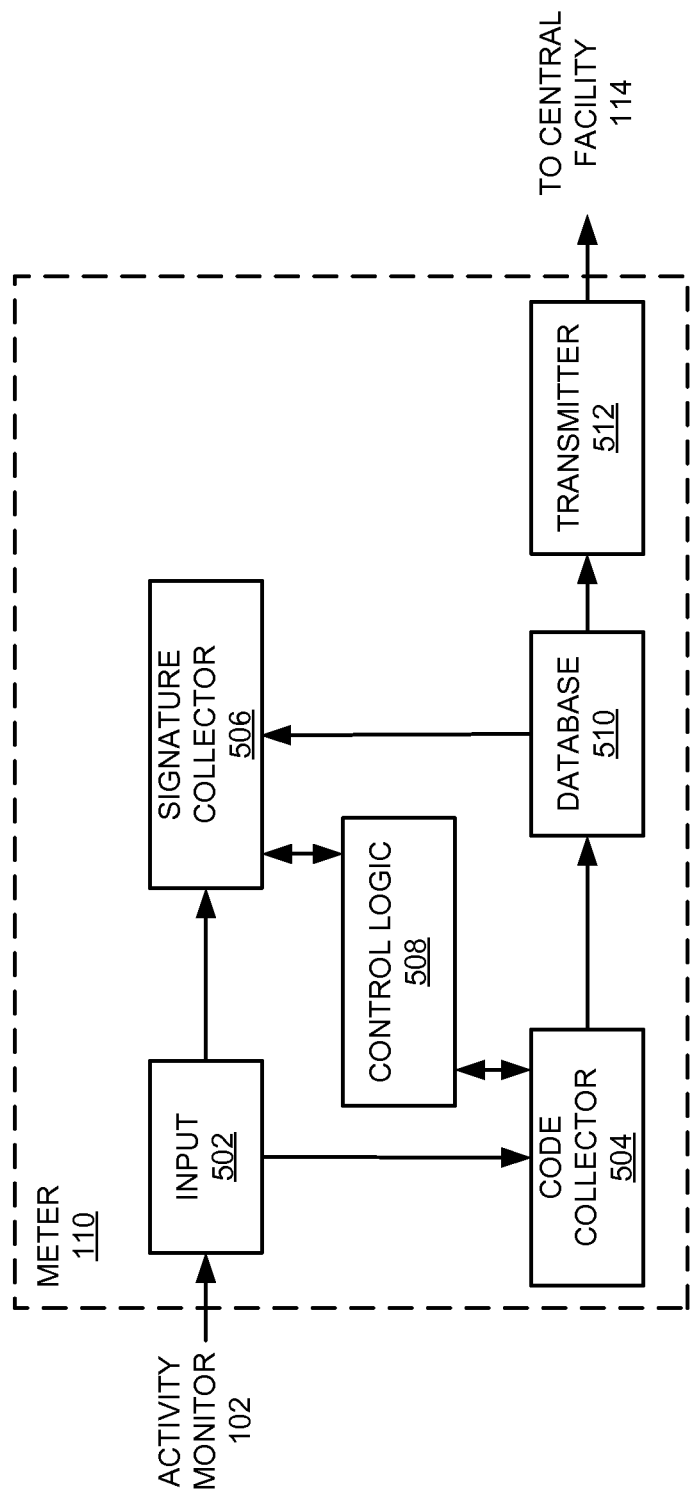
FIG. 5 illustrates an example implementation of the meter of FIG. 1.

FIG. 5 is a block diagram of an example implementation of the meter 110 of FIG. 1. The meter 110 of the illustrated example is used to collect, aggregate, locally process, and/or transfer data to a central data facility, such as the central data facility 114, via the network 116 of FIG. 1. In the illustrated example, the meter 110 is used to extract and/or analyze codes and/or signatures from data and/or signals collected by the activity monitor 102 and/or input to the meter 110 in another manner (e.g., free field audio detected by the meter 110 with a microphone exposed to ambient sound). The meter 110 of the illustrated example includes an input 502, a code collector 504, a signature generator 506, control logic 508, a database 510, and a transmitter 512.

Identification codes, such as watermarks, ancillary codes, etc. may be embedded within media signals. Identification codes are digital data that are inserted into content (e.g., audio) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of some characteristic of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety.

In the illustrated example, the input 502 obtains a data signal from a device, such as the activity monitor 102. In some examples, the input 502 is a microphone exposed to ambient sound in a monitored location and serves to collect audio played by an information presenting device. As described above, the activity monitor 102 may collect data and/or an output of signal (e.g., the audio component) from the media presentation device 104. Thus, in some examples, the input 502 receives the signal or a portion of the signal (e.g., the audio) from the activity monitor 102. The input 502 of the illustrated example passes the received signal (e.g., a digital audio signal) to the code collector 504 and/or the signature generator 506. The code collector 504 of the illustrated example extracts codes and/or the signature generator 506 generates signatures from the signal to identify broadcasters, channels, stations, and/or programs. The control logic 508 of the illustrated example is used to control the code collector 504 and the signature generator 506 to cause collection of a code, a signature, or both a code and a signature. The identified codes and/or signatures are stored in the database 510 of the illustrated example and are transmitted to the central facility 114 via the network 116 by the transmitter 512 of the illustrated example. Although the example of FIG. 5 collects codes and/or signatures from an audio signal, codes or signatures can additionally or alternatively be collected from other portion(s) of the signal (e.g., from the video portion).

While an example meter 110 has been illustrated in FIG. 5, one or more of the elements, processes and/or devices illustrated in FIG. 5 may be combined, divided, re-arranged, omitted, eliminated and/or implemented in any other way. Further the input 502, the code collector 504, the signature generator 506, the control logic 508, the database 510, the transmitter 512, and/or, more generally, the example meter 110 of FIG. 5 may be implemented by hardware, software, firmware and/or any combination of hardware, software and/or firmware. Thus, for example, any of the example input 502, the code collector 504, the signature generator 506, the control logic 508, the database 510, the transmitter 512, and/or, more generally, the example meter 110 of FIG. 5 could be implemented by one or more circuit(s), programmable processor(s), ASIC(s), PLD(s) and/or FPLD(s), etc. When any of the apparatus or system claims of this patent are read to cover a purely software and/or firmware implementation, at least one of the example input 502, the code collector 504, the signature generator 506, the control logic 508, the database 510, the transmitter 512, and/or the meter 110 are hereby expressly defined to include a tangible computer readable medium such as a memory, DVD, CD, Blu-ray, etc. storing the software and/or firmware. Further still, the example meter 110 of FIG. 5 may include one or more elements, processes and/or devices in addition to, or instead of, those illustrated in FIG. 5, and/or may include more than one of any or all of the illustrated elements, processes and devices.

Figure 6:
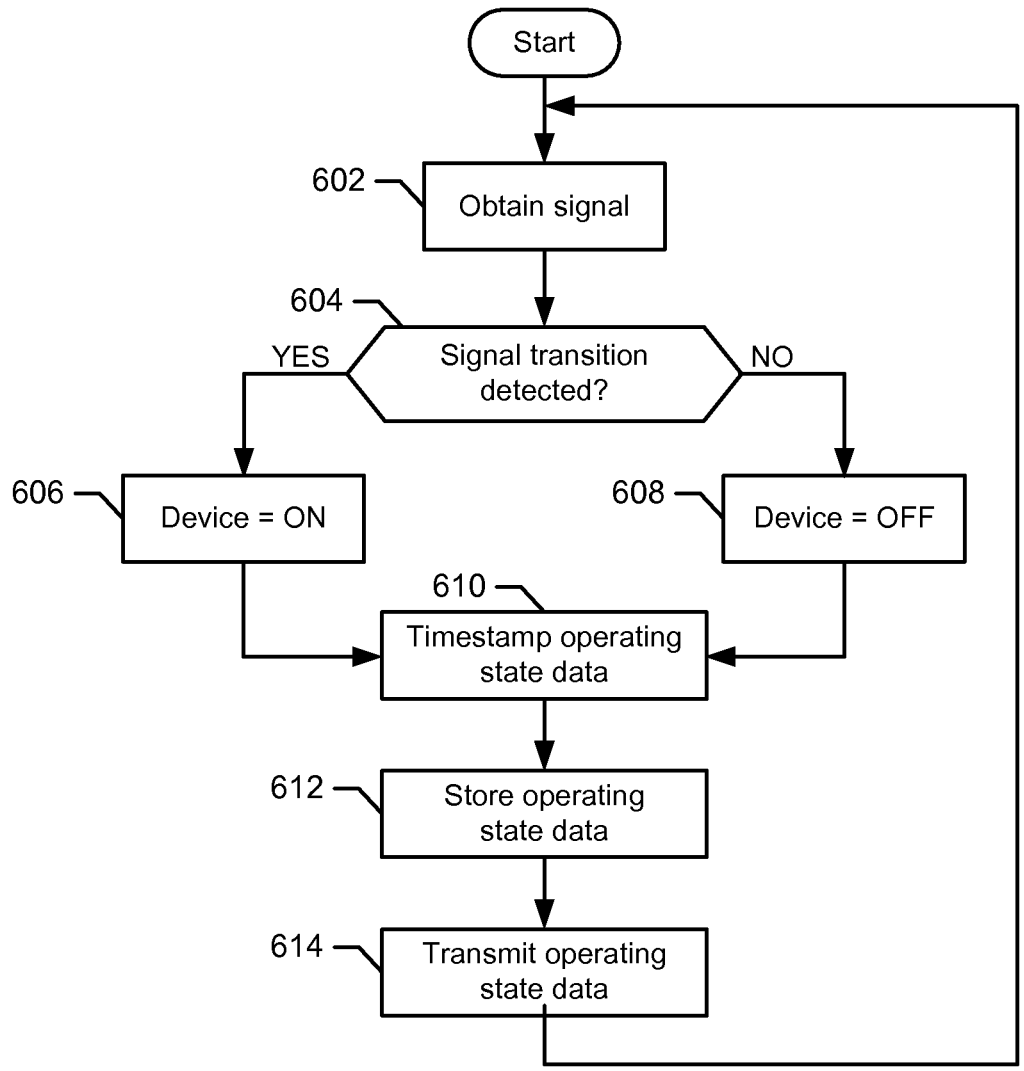
FIG. 6 is a flow diagram representative of example machine readable instructions that may be executed to implement the example activity monitor of FIG. 2.

A flowchart representative of example machine readable instructions for implementing the example activity monitor 102 of FIG. 2 is shown in FIG. 6. In this example, the machine readable instructions comprise a program for execution by a processor such as the processor 1012 shown in the example processor platform 1000 discussed below in connection with FIG. 10. The program may be embodied in software stored on a tangible computer readable medium such as a compact disc read-only memory ("CD-ROM"), a floppy disk, a hard drive, a DVD, Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 6, many other methods of implementing the example activity monitor 102 may alternatively be used. For example, the order of execution of the blocks may be changed, and/or some of the blocks described may be changed, eliminated, or combined.

As mentioned above, the example process of FIG. 6 may be implemented using coded instructions (e.g., computer readable instructions) stored on a tangible computer readable medium such as a hard disk drive, a flash memory, a read-only memory ("ROM"), a CD, a DVD, a cache, a random-access memory ("RAM") and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 6 is a flow diagram representative of example machine readable instructions that may be executed to implement the example activity monitor 102 of FIG. 2. The activity monitor 102 of the illustrated example is used to determine an operating state of a media presentation device, such as the media presentation device 104. The operating state of the media presentation device 104 is useful in the context of home audience measurement for example, to allow an audience measurement company to decide whether to credit audience exposure to media.

Initially, the input 204 of the illustrated example obtains a signal at the port 106 of the media presentation device 104 via the pass through port 202 (block 602). The input 204 of the illustrated example passes the signal to the transition detector 206. The transition detector 206 of the illustrated example attempts to detect a transition in the signal from the input 204 using the timer 208 (block 604). If a transition in the signal is detected, the transition detector 206 of the illustrated example determines the media presentation device 104 is in an on state (block 606). If a transition is not detected in the signal, the transition detector 206 of the illustrated example determines the media presentation device is in an off state (block 608).

The transition detector 206 of the illustrated example sends operating state data representative of whether the media presentation device 104 is in an on state or in an off state (e.g., a bit set high to indicate an on state and/or a bit set low to indicate an off state and/or a message indicating an on or off state) to the timestamper 210. The timestamper 210 of the illustrated example timestamps the operating state data (block 610) and sends the timestamped operating state data to the database 212. The database 212 of the illustrated example stores the timestamped operating state data (block 612) and sends the timestamped operating state data to the transmitter 214. The transmitter 214 of the illustrated example transmits the operating state data to, for example, a meter (e.g., the meter 110 of FIG. 1) (block 614). Control then returns to block 602 when the instructions are completed.

Figure 7:
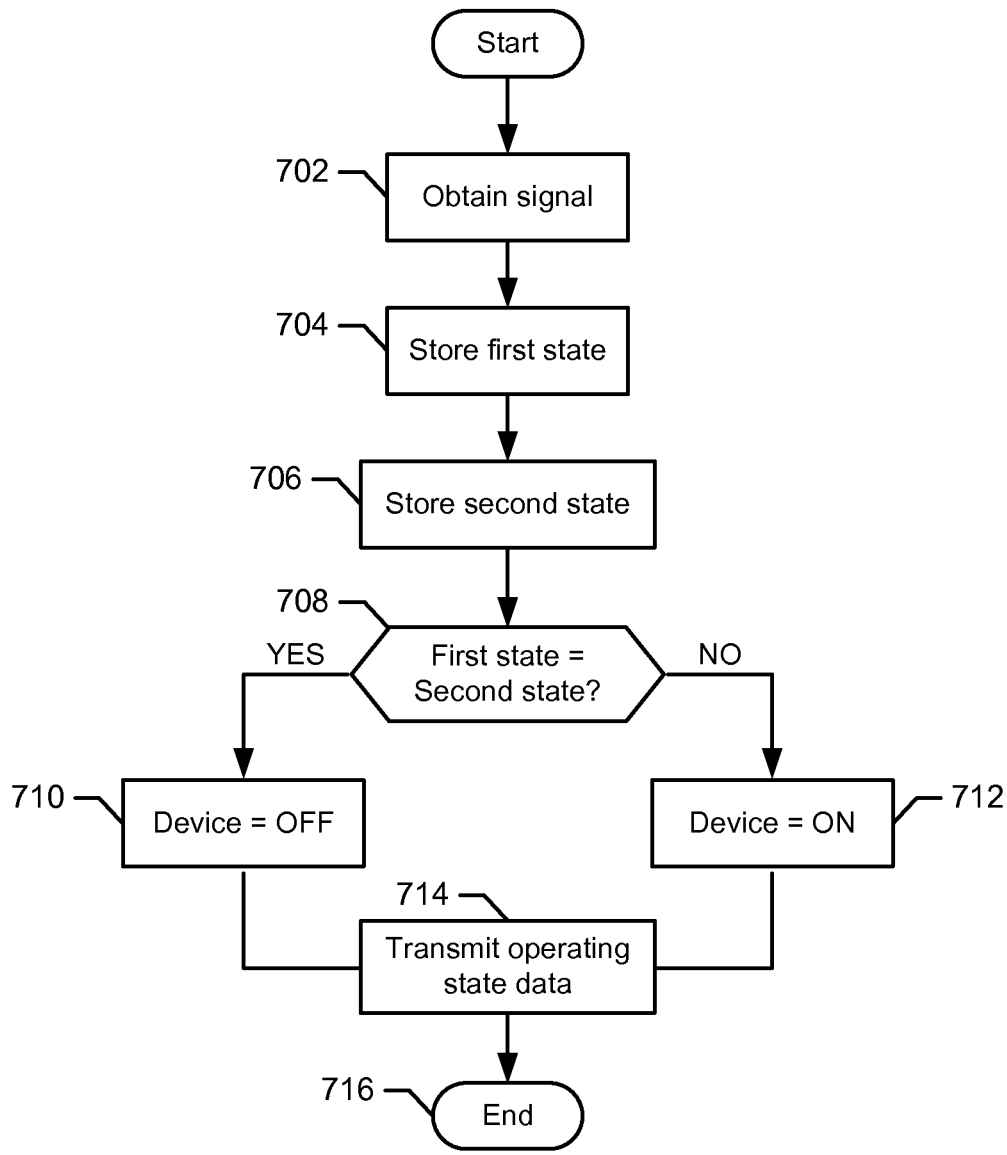
FIG. 7 is a flow diagram representative of example machine readable instructions that may be executed to implement the example transition detector of FIG. 3.

A flowchart representative of example machine readable instructions for implementing the example transition detector 206 of FIG. 3 is shown in FIG. 7 and described below. In this example, the machine readable instructions comprise a program for execution by a processor such as the processor 1012 shown in the example processor platform 1000 discussed below in connection with FIG. 10. The program may be embodied in software stored on a tangible computer readable medium such as a CD-ROM, a floppy disk, a hard drive, a DVD, Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 7, many other methods of implementing the example transition detector 206 may alternatively be used. For example, the order of execution of the blocks may be changed, and/or some of the blocks described may be changed, eliminated, or combined.

As mentioned above, the example process of FIG. 7 may be implemented using coded instructions (e.g., computer readable instructions) stored on a tangible computer readable medium such as a hard disk drive, a flash memory, a ROM, a CD, a DVD, a cache, a RAM and/or any other storage media in which information is stored for any duration (e.g., for extended time periods, permanently, brief instances, for temporarily buffering, and/or for caching of the information). Additionally or alternatively, the example process of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

FIG. 7 is a flow diagram representative of example machine readable instructions that may be executed to implement the example transition detector 206 of FIG. 3. The transition detector 206 of the illustrated example is used to determine an operating state of the media presentation device 104 by detecting a transition in a signal obtained from the media presentation device 104.

Initially, the transition detector 206 of the illustrated example obtains the signal from the input 204 (block 702). The first data storer 302 of the illustrated example receives the signal from the input 204 and stores a first state of the signal (block 704). The first state of the signal may be a high state or a low state (e.g., a bit set high or a bit set low). The first data storer 302 of the illustrated example uses a clock signal provided by the timer 208 to determine when to pass the signal to the second state storer 304. Once the signal is passed from the first state storer 302, the second state storer 304 of the illustrated example stores a second state of the signal (block 706). The second state of the signal may be a high state or a low state (e.g., a bit set high or a bit set low). The passing of the signal may be a continuous process such that, as the second state storer 304 is storing a second state of the signal, the first state storer 302 is storing a next first state of the signal. This process allows the transition detector 206 of the illustrated example to continuously compare states of the signal.

The first state storer 302 of the illustrated example passes the first state of the signal to the comparator 306. The second state storer 304 of the illustrated example passes the second state of the signal to the comparator 306. The comparator 306 of the illustrated example compares the first state and the second state to determine if there has been a transition in the signal (block 708). If the first state of the signal is equal to the second state of the signal (e.g., the first state is a bit set high and the second state is a bit set high), the comparator 306 of the illustrated example determines that there has been no transition in the signal and, thus, that the media presentation device 104 is in an off state (block 710). If the first state of the signal is different than the second state of the signal (e.g., the first state is a bit set high and the second state is a bit set low), the comparator 306 of the illustrated example determines that there has been a transition in the signal and, thus, that the media presentation device 104 is in an on state (block 712). The comparator 306 of the illustrated example passes operating state data indicative of whether the media presentation device 104 is in an on or off state to the timestamper 210 (block 714). Operating state data may be, for example, a bit set high to indicate the media presentation device 104 is in an on state and/or a bit set low to indicate the media presentation device 104 is in an off state and/or a message indicating an on or off state. The process ends when the instructions are complete (block 716).

Figure 8:
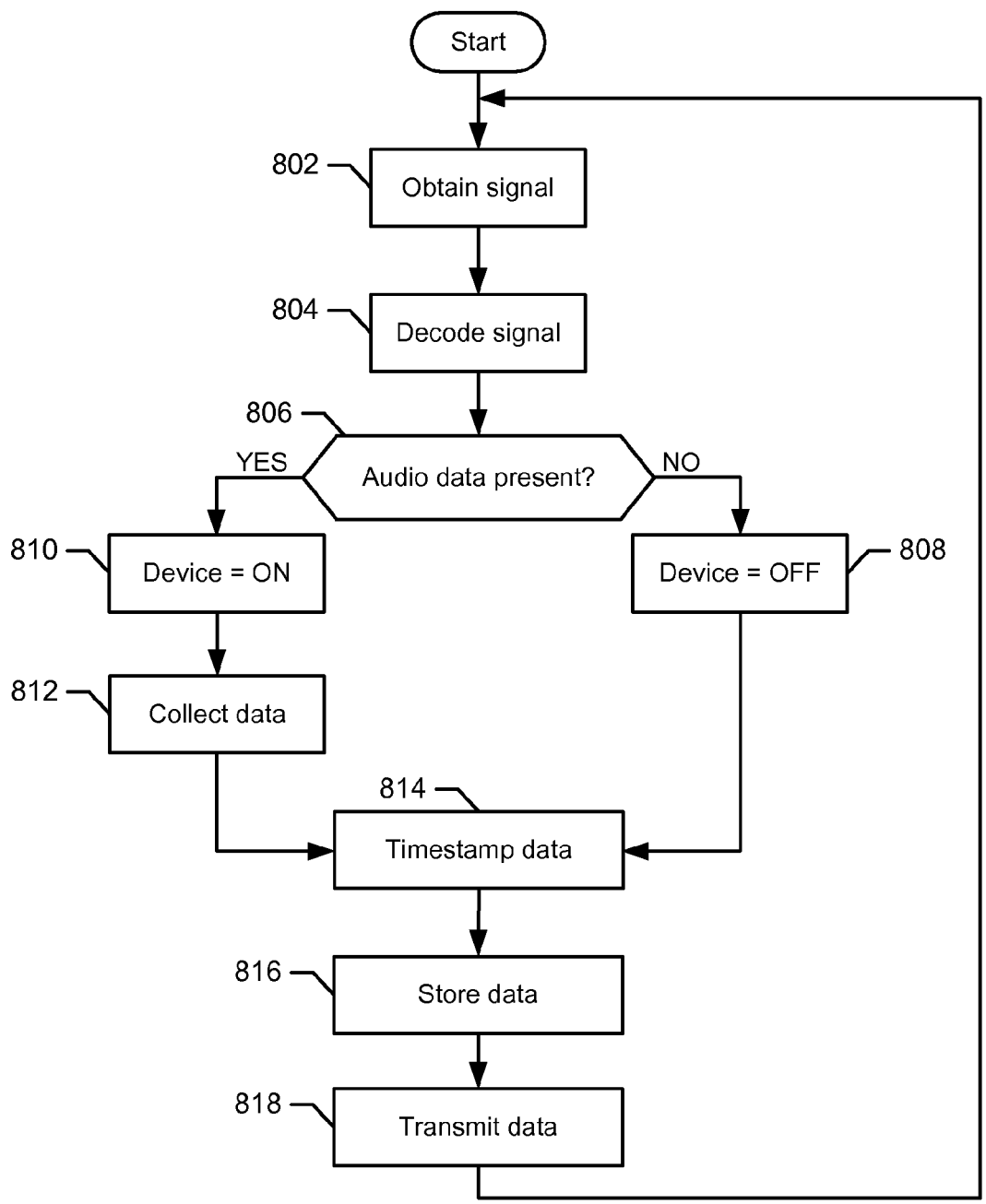
FIG. 8 is a flow diagram representative of example machine readable instructions that may be executed to implement the example activity monitor of FIG. 4.

A flowchart representative of example machine readable instructions for implementing the example activity monitor 102 of FIG. 4 is shown in FIG. 8. In this example, the machine readable instructions comprise a program for execution by a processor such as the processor 1012 shown in the example processor platform 1000 discussed below in connection with FIG. 10. The program may be embodied in software stored on a tangible computer readable medium such as a CD-ROM, a floppy disk, a hard drive, a DVD, Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 8, many other methods of implementing the example activity monitor 102 may alternatively be used. For example, the order of execution of the blocks may be changed, and/or some of the blocks described may be changed, eliminated, or combined.

As mentioned above, the example process of FIG. 8 may be implemented using coded instructions (e.g., computer readable instructions) stored on a tangible computer readable medium such as a hard disk drive, a flash memory, a ROM, a CD, a DVD, a cache, a RAM and/or any other storage media in which information is stored for any duration (e.g., for extended time periods, permanently, brief instances, for temporarily buffering, and/or for caching of the information). Additionally or alternatively, the example process of FIG. 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

FIG. 8 is a flow diagram representative of example machine readable instructions that may be executed to implement the example activity monitor 102 of FIG. 4. In the illustrated example, the activity monitor 102 determines an operating state of the media presentation device 104 by decoding a signal obtained at the port 106. The activity monitor 102 of the illustrated example also collects data from the signal obtained at the port 106.

Initially, the input 204 of the illustrated example obtains the signal from the port 106 of the media presentation device 104 via the pass through port 202 (block 802). The signal is then passed to the audio determiner 402. The audio determiner 402 of the illustrated example decodes the signal (block 804). The audio determiner 402 may decode the signal using any appropriate decoding method and/or technique. Once the signal has been decoded, the audio determiner 402 of the illustrated example determines if audio data is present (block 806). If audio data is not present, the audio determiner 402 of the illustrated example determines that the media presentation device 402 is in an off state (block 808). If audio data is present, the audio determiner 402 of the illustrated example determines that the media presentation device 104 is in an on state (block 810). The audio determiner 402 of the illustrated example collects data from the signal obtained from the data input 402 (block 812). Collected data may include, for example, a type of data transfer occurring, source information, a payload, a code, metadata, a signature and/or the audio signal itself.

The audio determiner 402 of the illustrated example passes operating state data indicative of whether the media presentation device 104 is in an on or off state and/or collected data to the timestamper 210. Operating state data may be, for example, a bit set high to indicate the media presentation device 104 is in an on state and/or a bit set low to indicate the media presentation device 104 is in an off state and/or a message indicating an on or off state. The timestamper 210 of the illustrated example timestamps the operating state data and/or collected data received from the audio determiner 402 (block 814) and passes the operating state data and/or collected data to the database 212. The database 212 of the illustrated example stores the operating state data and/or collected data (block 816) and passes the operating state data and/or collected data to the transmitter 214. The transmitter 214 of the illustrated example transmits the operating state data and/or collected data to the meter 110 (block 818). In some examples, the audio determiner 402 transfers collected data and/or the signal itself directly to the meter 110. In some examples, the transmitter 214 transfers data and/or the audio signal directly to a central facility, for example, the central facility 114 of FIG. 1, when no meter 110 is present. In some examples, the audio determiner 402 transfers the data and/or the audio signal directly to the transmitter 214 to be transmitted to the meter 110 and the meter performs the timestamping. Control returns to block 802 when the instructions are complete.

Figure 9:
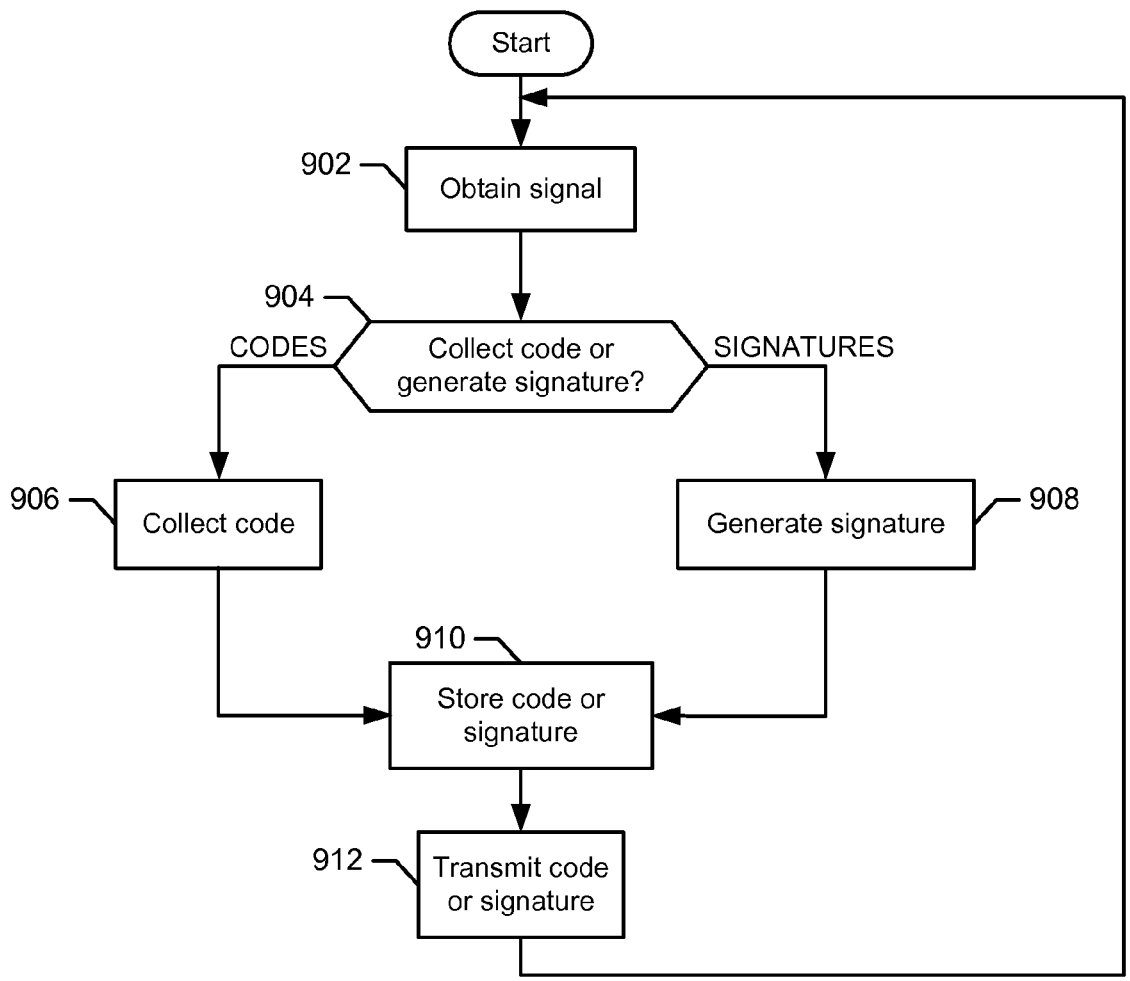
FIG. 9 is a flow diagram representative of example machine readable instructions that may be executed to implement the example meter of FIG. 5.

A flowchart representative of example machine readable instructions for implementing the example meter 110 of FIG. 5 is shown in FIG. 9. In this example, the machine readable instructions comprise a program for execution by a processor such as the processor 1012 shown in the example processor platform 1000 discussed below in connection with FIG. 10. The program may be embodied in software stored on a tangible computer readable medium such as a CD-ROM, a floppy disk, a hard drive, a DVD, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 10, many other methods of implementing the example meter 110 may alternatively be used. For example, the order of execution of the blocks may be changed, and/or some of the blocks described may be changed, eliminated, or combined.

As mentioned above, the example process of FIG. 9 may be implemented using coded instructions (e.g., computer readable instructions) stored on a tangible computer readable medium such as a hard disk drive, a flash memory, a ROM, a CD, a DVD, a cache, a RAM and/or any other storage media in which information is stored for any duration (e.g., for extended time periods, permanently, brief instances, for temporarily buffering, and/or for caching of the information). Additionally or alternatively, the example process of FIG. 9 may be implemented using coded instructions (e.g., computer readable instructions) stored on a non-transitory computer readable medium such as a hard disk drive, a flash memory, a ROM, a CD, a DVD, a cache, a RAM and/or any other storage media in which information is stored for any duration (e.g., for extended time periods, permanently, brief instances, for temporarily buffering, and/or for caching of the information).

FIG. 9 is a flow diagram representative of example machine readable instructions that may be executed to implement the example meter 110 of FIG. 5. The meter 110 of the illustrated example is used to collect, aggregate, locally process, and/or transfer data to a central data facility, such as the central data facility 114. In the illustrated example, the meter 110 is used to extract and/or analyze codes and/or signatures from data and/or signals collected by the example activity monitor 102 and/or received via other channels. The data collected by the meter 110 of the illustrated example is used in the context of home audience measurement to facilitate the collection and/or analysis of audience measurement data.

Initially, the input 502 of the illustrated example obtains a signal from the activity monitor 102 or via another channel (e.g., from free field audio sampled by a microphone of the meter 110 for a different device, etc.) (block 902). The control logic 508 of the illustrated example determines whether to collect a code or generate a signature from the signal obtained at the input 502 (block 904). In the illustrated example, either a code is collected or a signature is generated from the signal. In other examples, both a code and a signature are collected and/or generated.

If a code is to be collected, the code collector 504 of the illustrated example collects a code from the signal obtained at the input 502 (block 906). The code collector 504 of the illustrated example passes the collected code(s) to the database 510. If a signature is to be generated, the signature generator 506 generates a signature from the signal obtained at the input 502 (block 908). The signature generator 506 of the illustrated example passes the generated signature(s) to the database 510. The database 510 of the illustrated example stores the collected codes and/or generated signatures (block 910) and passes the codes and/or signatures to the transmitter 512. The transmitter 512 of the illustrated example transmits the collected codes and/or generated signatures to the central facility 114 via a network, such as the network 116. Control then returns to block 902 when the instructions are completed.

Figure 10:
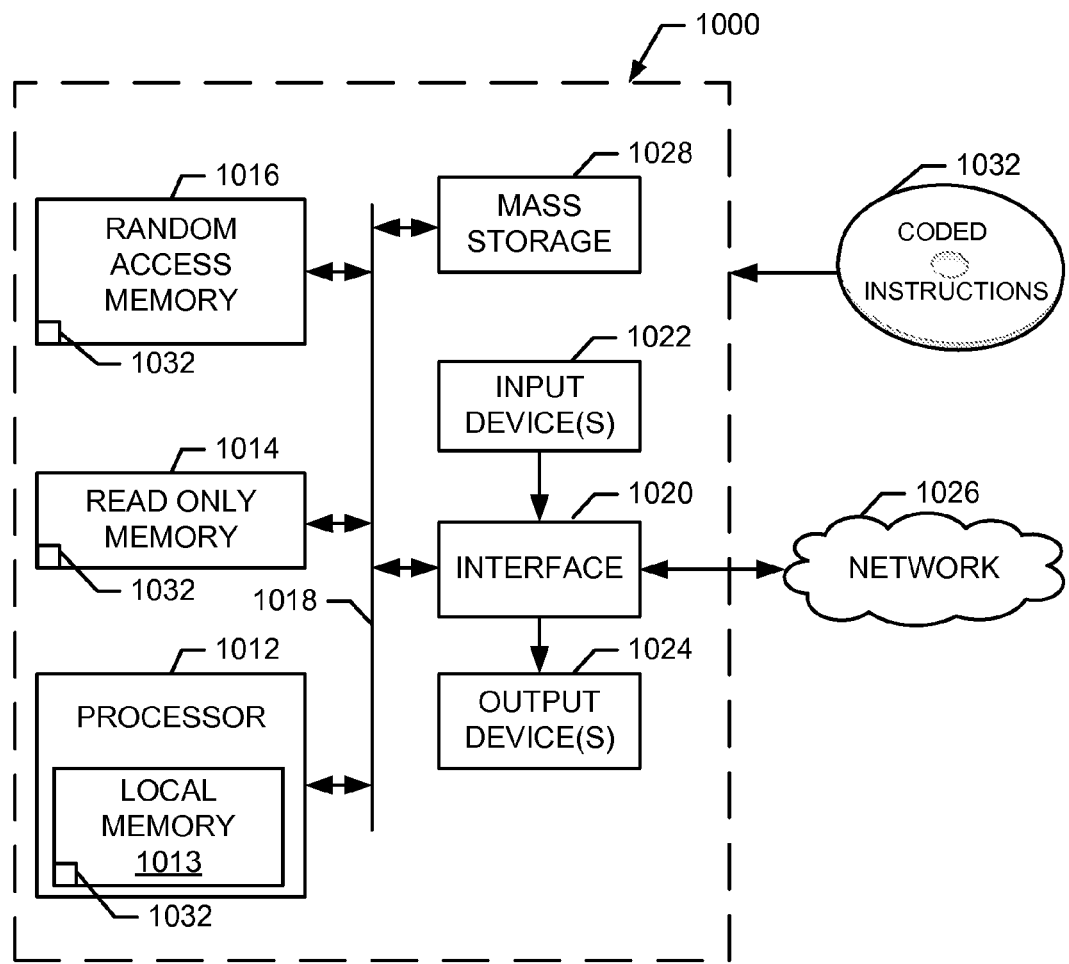
FIG. 10 is a block diagram of an example processor platform that may be used to execute the instructions of FIGS. 6, 7, 8, and/or 9 to implement the example activity monitor of FIG. 2, the example transition detector of FIG. 3, the example activity monitor of FIG. 4, the example meter of FIG. 5, and/or, more generally, the example system of FIG. 1.

FIG. 10 is a block diagram of an example processor platform 1000 capable of executing the instructions of FIGS. 6, 7, 8, and/or 9 to implement the example activity monitor 102 of FIG. 2, the example transition monitor 206 of FIG. 3, the example activity monitor 102 of FIG. 4, the example meter 110 of FIG. 5, and/or the system of FIG. 1. The processor platform 1000 can be, for example, a server, a personal computer, an Internet appliance, a set top box, or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a non-volatile memory 1014 and a volatile memory 1016 via a bus 1018. The volatile memory 1016 may be implemented by Synchronous Dynamic Random Access Memory ("SDRAM"), Dynamic Random Access Memory ("DRAM"), RAMBUS Dynamic Random Access Memory ("RDRAM") and/or any other type of random access memory device. The non-volatile memory 1014 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, and/or a trackball.

One or more output devices 1024 are also connected to the interface circuit 1020. The output devices 1024 can be implemented, for example, by display devices (e.g., a liquid crystal display, a cathode ray tube display ("CRT"), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a DSL, a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and DVD drives. The mass storage device 1028 may implement a local storage device.

The coded instructions 1032 of FIGS. 6, 7, 8, and/or 9 may be stored in the mass storage device 1028, in the volatile memory 1016, in the non-volatile memory 1014, and/or on a removable storage medium such as a CD or DVD.

Although certain example methods, systems, apparatus, and articles of manufacture have been described herein, the scope of coverage of this patent is not limited thereto. On the contrary, this patent covers all methods, systems and articles of manufacture fairly falling within the scope of the claims of this patent.

What is claimed is:

1. A method to monitor a media device, the method comprising:
    intercepting a digital audio signal at a first port that is in communication with a processer and is connected in an audio path between a second port associated with the media device and a third port associated with a second device, the digital signal being output by the second port associated with the media device;

passing the digital audio signal to the third port associated with the second device via a fourth port in communication with the first port and the third port;

attempting, by executing a first instruction with a processor, to detect logical transitions between sequential bits of the digital audio signal output at the second port associated with the media device, the digital audio signal to be encoded via differential encoding;

in response to detecting a first logical transition between two sequential bits of the digital audio signal output at the second port associated with the media device, generating operating state data by executing a second instruction with the processor, the operating state data including a first time and indicating that the media device was in an on state at the first time; and when the logical transitions are not detected at the second port associated with the media device, generating the operating state data by executing a third instruction with the processor, the operating state data including the first time and indicating that the media device was in an off state at the first time.

2. The method as defined in claim 1, wherein the digital audio signal is output using a Sony/Philips Digital Interconnect Format.

3. The method as defined in claim 1, wherein the attempting to detect the logical transitions in the digital audio signal includes:

comparing a first binary state of a first bit of a sequence of bits of the digital audio signal to a second binary state in a second bit of the sequence of bits, the second bit occurring after the first bit;

when the first binary state is different than the second binary state, determining that the first logical transition has occurred; and when the first binary state is not different than the second binary state, determining that the first logical transition has not occurred.

4. The method as defined in claim 1, further including transmitting the operating state data.

5. The method as defined in claim 1, wherein the differential encoding is biphase mark coding.

6. An apparatus to monitor a media device using a digital audio signal, the apparatus comprising:

a first port and a second port, the first port connected in an audio path between a third port associated with the media device and a fourth port associated with a second device, the first port to receive the digital audio signal output by the third port associated with the media device, the digital audio signal to be encoded via differential encoding, the second port to pass the digital audio signal to the fourth port associated with the second device; and a transition detector to:
attempt to detect logical transitions between sequential bits of the digital signal;

in response to detecting a first logical transition between two sequential bits of the digital audio signal output at the third port associated with the media device, generate operating state data including a first time and indicating that the media device was in an on state at the first time; and when the logical transitions are not detected at the third port associated with the media device, generate the operating state data including the first time and indicating that the media device was in an off state at the first time.

7. The apparatus as defined in claim 6, wherein the digital audio signal is output using a Sony/Philips Digital Interconnect Format.

8. The apparatus as defined in claim 6, further including a transmitter to transmit the operating state data.

9. The apparatus as defined in claim 6, further including a comparator to:

compare a first binary state of a first bit in a sequence of bits of the digital audio signal to a second binary state in a second bit of the sequence of bits, the second bit being immediately adjacent the first bit;

when the first binary state is different than the second binary state, determine that the digital audio signal has transitioned; and when the first binary state is not different than the second binary state, determine that the digital audio signal has not transitioned.

10. The apparatus as defined in claim 6, wherein the differential encoding is biphase mark coding.

11. A tangible computer readable medium comprising computer readable instructions which, when executed, cause a processor to at least:

intercept a digital audio signal at a first port that is in communication with a processer and is connected in an audio path between a second port associated with a media device and a third port associated with a second device, the digital audio signal being output by the second port associated with the media device;

transmit the digital audio signal to the third port associated with the second device via a fourth port in communication with the first port and the third port;

attempt to detect logical transitions between sequential bits of a digital audio signal output at the second port associated with the media device, the digital audio signal to be encoded via differential encoding;

in response to detecting a first logical transition, generate operating state data including a first time and indicating that the media device was in an on state at the first time; and when the logical transitions are not detected at the second port associated with the media device, generate the operating state data including the first time and indicating that the media device was in an off state at the first time.

12. The computer readable medium as defined in claim 11, wherein the instructions are to cause the processor to attempt to detect the logical transition in the digital audio signal by:

comparing a first binary state of a first bit of a sequence of bits of the digital audio signal to a second binary state in a second bit of the sequence of bits, the second bit occurring after the first bit;

when the first binary state is different than the second binary state, determining that the first logical transition has occurred; and when the first binary state is not different than the second binary state, determining that the first logical transition has not occurred.

13. The computer readable medium as defined in claim 11, wherein the digital audio signal is output using a Sony/Philips Digital Interconnect Format.

14. The computer readable medium as defined in claim 11, wherein the instructions are further to cause the processor to transmit the operating state data.

15. The computer readable medium as defined in claim 11, wherein the differential encoding is biphase mark coding.

* * * * *